(12) United States Patent
Ksheerasagar et al.

(10) Patent No.: US 12,086,521 B2
(45) Date of Patent: Sep. 10, 2024

(54) CIRCUIT DESIGN SIMULATION AND CLOCK EVENT REDUCTION

(71) Applicant: Xilinx, Inc., San Jose, CA (US)

(72) Inventors: Tharun Kumar Ksheerasagar, Telangana (IN); Rohit Bhadana, Faridabad (IN); Hemant Kashyap, Hyderabad (IN); Pratyush Ranjan, Patna (IN)

(73) Assignee: Xilinx, Inc., San Jose, CA (US)

( * ) Notice: Subject to any disclaimer, the term of this patent is extended or adjusted under 35 U.S.C. 154(b) by 380 days.

(21) Appl. No.: 17/496,198

(22) Filed: Oct. 7, 2021

(65) Prior Publication Data

US 2023/0114858 A1 Apr. 13, 2023

(51) Int. Cl.
*G06F 30/3312* (2020.01)
*G06F 30/327* (2020.01)
*G06F 119/12* (2020.01)

(52) U.S. Cl.
CPC ........ *G06F 30/3312* (2020.01); *G06F 30/327* (2020.01); *G06F 2119/12* (2020.01)

(58) Field of Classification Search
USPC .......................................................... 716/108
See application file for complete search history.

(56) References Cited

U.S. PATENT DOCUMENTS

| | | | |
|---|---|---|---|
| 7,197,445 B1 | 3/2007 | Deepak et al. | |
| 7,302,377 B1 | 11/2007 | Deepak | |
| 7,330,808 B1 | 2/2008 | Jorgensen et al. | |
| 7,451,417 B1 | 11/2008 | Campbell | |
| 7,590,137 B1 | 9/2009 | Chan | |
| 7,636,653 B1 | 12/2009 | Chan | |
| 7,673,201 B1 | 3/2010 | Chan | |
| 7,707,019 B1 | 4/2010 | Ballagh et al. | |
| 7,721,090 B1 | 5/2010 | Deepak et al. | |
| 7,739,092 B1 | 6/2010 | Ballagh et al. | |
| 7,895,026 B1 | 2/2011 | Kelly et al. | |
| 7,930,162 B1 | 4/2011 | Chan et al. | |
| 8,041,553 B1 | 10/2011 | Hernandez et al. | |
| 8,074,077 B1 | 12/2011 | Neema et al. | |
| 8,150,638 B1 | 4/2012 | Wu et al. | |
| 8,195,441 B1 | 6/2012 | Ou et al. | |
| 8,352,229 B1 | 1/2013 | Ma et al. | |
| 8,667,450 B2 * | 3/2014 | Wang ................... | G06F 30/398 716/136 |
| 8,769,448 B1 | 7/2014 | Sundararajan et al. | |
| 9,117,043 B1 | 8/2015 | Huang et al. | |
| 9,223,910 B1 | 12/2015 | Ghosh et al. | |

(Continued)

*Primary Examiner* — Mohammed Alam
(74) *Attorney, Agent, or Firm* — Kevin T. Cuenot

(57) ABSTRACT

Circuit design simulation and clock event reduction may include detecting, using computer hardware, a plurality of models of a circuit design driven by a clock source by parsing the circuit design. The circuit design is a mixed language circuit design including a hardware description language (HDL) model and a high-level programming language (HLPL) model. Using the computer hardware, a clock requirement for the HLPL model for a simulation of the circuit design may be determined. The clock requirement of the HLPL model differs from a clock requirement of the HDL model. Using the computer hardware, an interface of the HLPL model may be modified based on the clock requirement of the HLPL model.

20 Claims, 7 Drawing Sheets

(56) References Cited

U.S. PATENT DOCUMENTS

| | | | |
|---|---|---|---|
| 9,684,750 B1* | 6/2017 | Bernard | G06F 30/30 |
| 9,811,618 B1 | 11/2017 | Parekh et al. | |
| 10,296,673 B1 | 5/2019 | Ghosh et al. | |
| 10,437,946 B1 | 10/2019 | Kasat et al. | |
| 10,437,949 B1 | 10/2019 | Mihalache et al. | |
| 10,671,785 B1 | 6/2020 | Mihalache et al. | |
| 2009/0112554 A1* | 4/2009 | Walter | G06F 30/33 |
| | | | 703/14 |
| 2017/0337314 A1* | 11/2017 | Anderson | G06F 30/327 |
| 2018/0165392 A1* | 6/2018 | Guthrie | G06F 30/33 |
| 2022/0269847 A1* | 8/2022 | Tsai | G06F 1/10 |
| 2022/0327269 A1* | 10/2022 | Seo | G06F 30/3312 |
| 2023/0114858 A1* | 4/2023 | Ksheerasagar | G06F 30/3312 |
| | | | 716/108 |

* cited by examiner

CIRCUIT DESIGN SIMULATION AND CLOCK EVENT REDUCTION

TECHNICAL FIELD

This disclosure relates to simulating circuit designs for implementation in integrated circuits (ICs) and, more particularly, to reducing the amount of clock events used during circuit design simulations.

BACKGROUND

Computer-based simulation is a valuable tool for verifying the functionality of circuit designs and ensuring that circuit designs are likely to meet established design requirements. Computer-based simulation allows such verification without having to implement the circuit design within an integrated circuit (IC). Though useful, computer-based simulations do execute significantly more slowly than actual implementations of circuit designs in ICs. As ICs become larger and more sophisticated, so too do the circuit designs intended for implementation in such ICs. The increased size and complexity of circuit designs often translates into longer compile times and slower runtimes for computer-based simulation.

SUMMARY

In one or more example implementations, a method can include detecting, using computer hardware, a plurality of models of a circuit design driven by a clock source by parsing the circuit design. The circuit design is a mixed language circuit design including a hardware description language (HDL) model and a high-level programming language (HLPL) model. The method can include determining, using the computer hardware, a clock requirement for the HLPL model for a simulation of the circuit design. The clock requirement of the HLPL model differs from a clock requirement of the HDL model. The method can include modifying, using the computer hardware, an interface of the HLPL model based on the clock requirement of the HLPL model.

In one or more example implementations, a system includes a processor configured to initiate operations. The operations can include detecting a plurality of models of a circuit design driven by a clock source by parsing the circuit design. The circuit design is a mixed language circuit design including an HDL model and an HLPL model. The operations can include determining a clock requirement for the HLPL model for a simulation of the circuit design. The clock requirement of the HLPL model differs from a clock requirement of the HDL model. The operations can include modifying an interface of the HLPL model based on the clock requirement of the HLPL model.

In one or more example implementations, a computer program product includes one or more computer readable storage media, and program instructions collectively stored on the one or more computer readable storage media. The program instructions are executable by computer hardware to initiate operations. The operations can include detecting a plurality of models of a circuit design driven by a clock source by parsing the circuit design. The circuit design is a mixed language circuit design including an HDL model and an HLPL model. The operations can include determining a clock requirement for the HLPL model for a simulation of the circuit design. The clock requirement of the HLPL model differs from a clock requirement of the HDL model. The operations can include modifying an interface of the HLPL model based on the clock requirement of the HLPL model.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
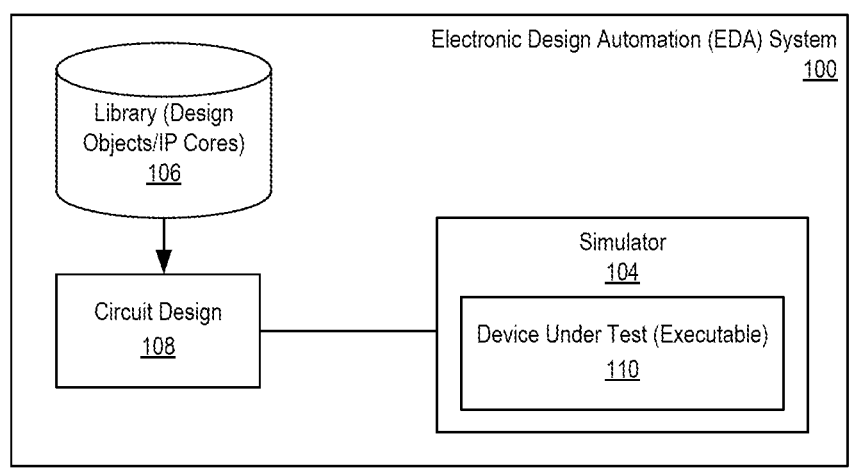
FIG. 1 illustrates an example of a computer-based Electronic Design Automation (EDA) system.

This disclosure relates to simulating circuit designs for implementation in integrated circuits (ICs) and, more particularly, to reducing the amount of clock events used during circuit design simulations. In accordance with the inventive arrangements described within this disclosure, methods, systems, and computer program products are provided that are capable of simulating mixed language circuit designs more efficiently. A mixed language circuit design is one that includes models that are specified in multiple different languages.

For example, a mixed language circuit design typically includes one or more hardware description language (HDL) models and one or more high-level programming language (HLPL) models. HDL models are cycle accurate models while HLPL models are often transactional or functional models. Within a discrete, event-based simulator, a variety of different simulation events are generated and distributed among the models of the circuit design during simulation. Clock events are an example simulator event type provided to the different models of the mixed language circuit design during simulation. Clock events typically constitute the largest number of simulator events occurring during simulation. The large number of clock events generated during a simulation can degrade simulation runtime performance. The different types of models included in a mixed language circuit design often have different clocking requirements. In conventional discrete, event-based simulators, however, clock events are distributed to each of these different models regardless of type. That is, the clock events provided to the various different models of the mixed language circuit design are not adapted to the particular clock requirements of the various models.

In one or more example implementations, an Electronic Design Automation (EDA) system is capable of processing a mixed language circuit design to detect the various different types of models included therein. The EDA system is capable of determining the clock requirements, e.g., usage of clock events, by the various HLPL models of the mixed language circuit design. The EDA system is capable of implementing a software-based clock infrastructure executed, e.g., used, during simulation. The software-based clock infrastructure is adapted to the different HLPL models based on the respective clock requirements of the HLPL models. As such, rather than providing clock events, e.g., all clock events, to all models during simulation of the mixed language circuit design, the EDA system is capable of simulating the mixed language circuit design so that HLPL models receive clock information, e.g., only clock information, that is needed for the simulation. The amount of clock information provided to the HLPL models is often significantly less than the amount of clock information (e.g., all clock events) that would otherwise be provided to the HLPL models and less than the amount of clock information (e.g., all clock events) that is provided to the HDL models. Clock information may include clock period, duty cycle, first edge type (positive or negative), offset, other clock-related metadata. Clock information may include any of the aforementioned data items individually or in combination.

As a result, during a simulation of the mixed language circuit design, the number of clock events that are generated and distributed to models of the mixed language circuit design may be significantly reduced. By reducing the number of clock events that are distributed during runtime of the simulation, runtime efficiency of the simulation can be significantly improved. Further aspects of the inventive arrangements are described below with reference to the figures.

FIG. 1 illustrates an example of a computer-based Electronic Design Automation (EDA) system 100. EDA system 100 may be implemented as a data processing system, e.g., a computer, executing suitable operational software or program code to perform the operations described within this disclosure. An example of a data processing system is described herein in connection with FIG. 12.

EDA system 100 may include a simulator 104. EDA system 100 may include a library 106 that stores various design objects such as models of circuit structures and/or functions. In one aspect, models may be implemented as Intellectual Property (IP) cores. The IP cores, or models, may be specified as HDL models or as HLPL models. A circuit design 108 may be created within EDA system 100 using these models. Circuit design 108 is implemented as a mixed language circuit design in that circuit design 108 includes both HDL and HLPL models.

The term "Intellectual Property core" or "IP core" refers to a pre-designed and reusable unit of logic design, a cell, or a portion of chip layout design in the field of electronic circuit design. An IP core may be expressed as a data structure specifying a description of circuitry that performs a particular function. An IP core may be expressed using hardware description language file(s) (e.g., as a Register Transfer Level or "RTL" description), as a netlist, as an HLPL description, as a bitstream that programs a programmable IC, or the like. An IP core may be used as a building block within circuit designs adapted for implementation within an IC. An IP core may include additional resources such as source code, scripts, HLPL models, schematics, documentation, constraints, and the like.

Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

As defined herein, the term "high-level programming language" or "HLPL" means a programming language, or set of instructions, used to program a data processing system where the instructions have a strong abstraction from the details of the data processing system, e.g., machine language. For example, a high-level programming language may automate or hide aspects of operation of the data processing system such as memory management. The amount of abstraction typically defines how "high-level" the programming language is. Using a high-level programming language frees the user from dealing with registers, memory addresses, and other low-level features of the data processing system upon which the high-level programming language will execute. In this regard, a high-level programming language may include little or no instructions that translate directly, on a one-to-one basis, into a native opcode of a central processing unit (CPU) of a data processing system. Examples of high-level programming languages include, but are not limited to, C, C++, SystemC, OpenCL C, or the like.

As defined herein, the term "hardware description language" or "HDL" is a computer-language that facilitates the documentation, design, and manufacturing of a digital system, such as an integrated circuit. An HDL is expressed in human readable form and combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency.

In contrast to most high-level programming languages, an HDL also includes an explicit notion of time, e.g., clocks and/or clock signals, which is a primary attribute of a digital system. For example, an HDL design may describe the behavior of a circuit design as data transfers occur between registers each clock cycle. Examples of HDLs may include, but are not limited to, Verilog and VHDL. HDLs are sometimes referred to as RTL descriptions of circuit designs and/or digital systems. Both Verilog and VHDL support the ability to specify attributes on modules in their native syntax.

In the example of FIG. 1, circuit design 108 may be compiled by EDA system 100 to generate an executable version of circuit design 108 referred to herein as Device Under Test (DUT) 110. DUT 110 may be an executable version of circuit design 108 that may be simulated using simulator 104. Simulator 104 may be implemented as executable program code that, when executed, implements a discrete, event-based simulator. Simulator 104 is capable of simulating DUT 110.

In general, simulation includes two phases. The first phase is referred to as compilation as performed by EDA system 100. During compilation, circuit design 108 is parsed, elaborated, and executable program code is generated from circuit design 108 as DUT 110. The second phase is a runtime phase where DUT 110, e.g., the executable program code generated during compilation, is loaded into memory of a data processing system and executed.

As part of the compilation process, EDA system 100 is capable of performing various operations that improve the runtime phase of simulation as performed by simulator 104 in simulating DUT 110 (e.g., improving runtime efficiency of simulation). For example, EDA system 100 is capable of performing operations including, but not limited to, detecting a plurality of models of circuit design 108 that are driven by a clock source by parsing circuit design 108. Circuit design 108, as noted, is a mixed language circuit design including one or more HDL models and one or more HLPL models. EDA system 100 is capable of determining a clock requirement for the HLPL model(s) for a simulation of circuit design 108. The clock requirement of the HLPL model often differs from a clock requirement of the HDL model(s). EDA system 100 is capable of modifying an interface of the HLPL model(s) based on the clock requirement of the respective HLPL model(s).

In one or more example implementations, the various models of circuit design 108 include or are associated with metadata. The metadata associated with a given model describes the clock requirements of the model. The metadata also indicates a level of abstraction of the model. EDA system 100 is capable of reading and parsing the metadata to determine the clock requirements of the respective models included or used in circuit design 108.

In an example implementation, EDA system 100 is capable of detecting a plurality of models in circuit design 108 that are coupled to a clock channel. Within this disclosure, the term "clock channel" refers to a software construct such as wire or clock source that is configured to convey or represent conveyance of a clock signal to objects in the circuit design. The clock channel may be an HDL construct configured to convey a Boolean clock signal. During simulation, the clock channel conveys clock events to the models of the circuit design connected thereto. The clock channel, for example, may provide a clock event corresponding to each transition of the clock signal. In one aspect, the clock requirement of an HLPL model refers to the particular clock information that is needed by the HLPL model to execute accurately and as intended during the simulation.

Figure 2:
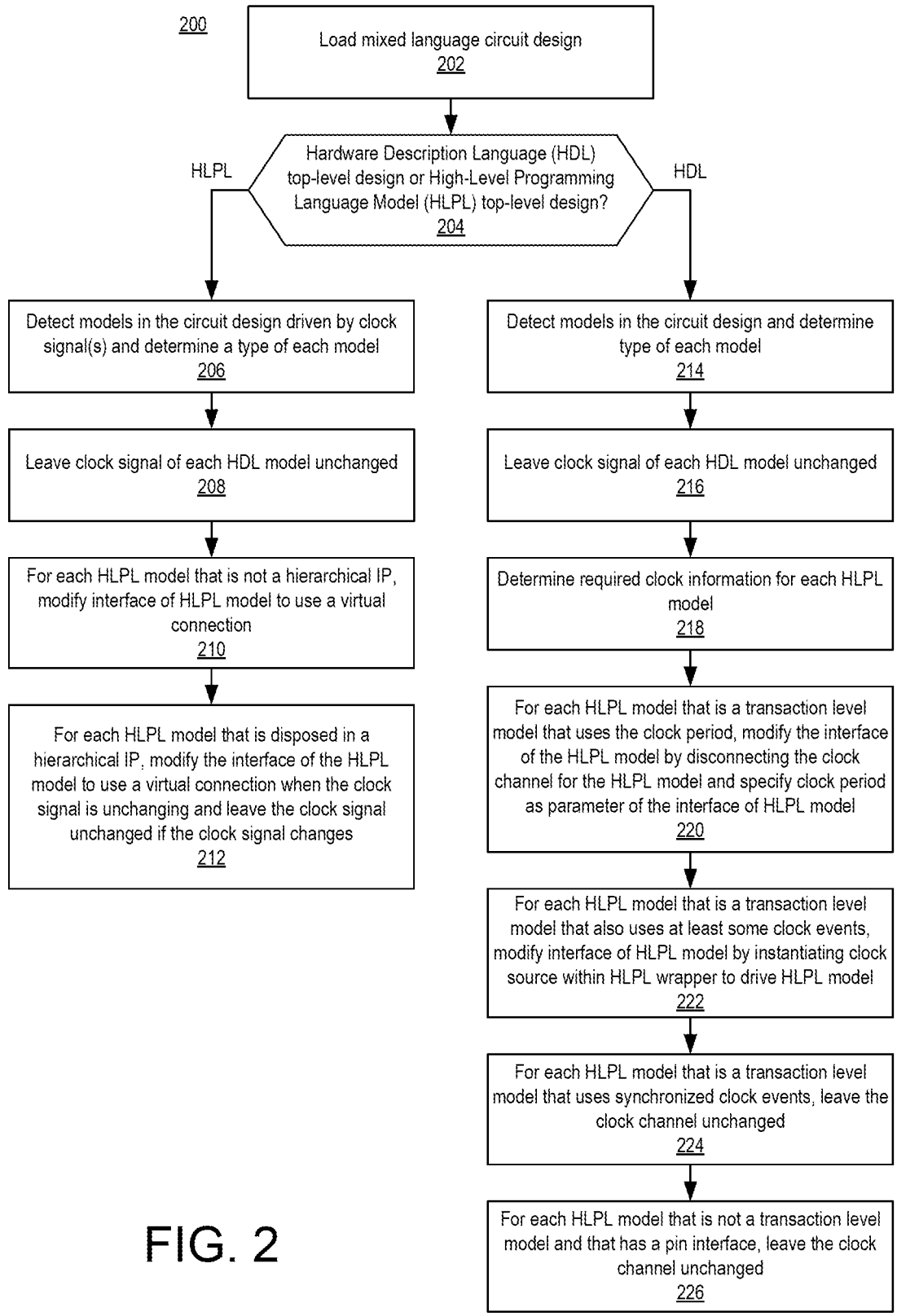
FIG. 2 illustrates an example method of simulating a mixed language circuit design in accordance with the inventive arrangements described within this disclosure.

FIG. 2 illustrates an example method 200 of simulating a mixed language circuit design in accordance with the inventive arrangements described within this disclosure. Method 200 may be performed by an EDA system as described herein in connection with FIG. 1. For example, EDA system 100 is capable of performing the operations described in FIG. 2 as part of a process, e.g., compilation, of generating executable program code corresponding to DUT 110 for simulation in simulator 104.

In block 202, EDA system 100 is capable of loading circuit design 108 into memory for processing. In block 204, EDA system 100 determines whether the top-level design of circuit design 108 is specified in an HDL or in an HLPL. For example, circuit design 108 may be a hierarchical circuit design containing a plurality of levels of hierarchy. In response to determining that the top-level design is specified in HLPL, method 200 continues to block 206. In response to determining that the top-level design is specified in HDL, method 200 continues to block 214.

In block 206, EDA system 100 is capable of detecting the models in the circuit design driven by a clock source and determine a type of each model. For example, for each model determined to be driven by a clock source, EDA system 100 determines whether the model is an HDL model or an HLPL model.

In block 208, EDA system 100 leaves the clock channel coupled to, e.g., or driving, each HDL model unchanged. Referring to the example of FIG. 3, HLPL top-level design 302 of circuit design 108 includes a clock source 304 driving an HDL model 310 by way of a clock channel 306. HDL model 310 is disposed in an HLPL wrapper 308.

In a software context, the term "wrapper" refers to program code that encapsulates selected program code of a selected programming language so that the selected program code may be utilized or called by other program code specified in a language other than, e.g., different from, that of the selected programming language. The wrapper may be specified as a program, as code, as individual software components, as independent software products, as software architectures, as classes in object-oriented programming, as a framework, or the like. The program code in the "main program" communicates exclusively with the wrapper. The wrapper forwards the commands to the wrapped program code and returns any results generated by the wrapped program code to the main program. The wrapper is the only software component that communicates directly with both the wrapper program code and the main program.

Figure 3:
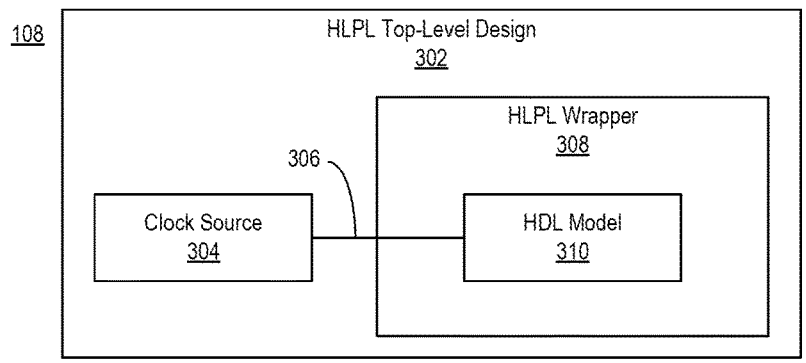
FIG. 3 illustrates an example of a mixed language circuit design including a hardware description language (HDL) model.

In the example of FIG. 3, HDL model 310 is wrapped by HLPL wrapper 308. Clock source 304 is the portion of the main program, e.g., of HLPL top-level design 302, that communicates with HDL model 310 by way of HLPL wrapper 308. Clock channel 306 is left unchanged since HDL model 310 is a cycle accurate model that consumes or requires each clock event conveyed over clock channel 306 for accurate operation during the simulation. In the example of FIG. 3, clock channel 306 conveys each clock event, where each clock event indicates a clock edge of a clock signal, to simulate the cycling of the clock signal so that HDL model 310 is capable of generating cycle accurate simulation results during the simulation (e.g., at runtime). The clock events may be specified as a Boolean variable that continually switches between 0 and 1 to simulate clock edges of a clock of circuit design 108.

In block 210, for each HLPL model that is not disposed in a hierarchical model, EDA system 100 is capable of modifying the interface of the HLPL model. For example, EDA system 100 is capable of modifying the interface of the HLPL model to use a virtual channel. As defined within this disclosure, a virtual channel is an HLPL communication channel that couples a clock source with a clock sink by way of a reference. The virtual channel conveys less clock data than its clock channel counterpart. In one aspect, a virtual channel communicates data as a function call, e.g., as a transaction, as used or implemented in an HLPL as opposed to simulating the conveyance of data over individual wires as in the case of HDL.

In the case of block 210, the virtual channel conveys the clock period to the HLPL model. The clock period, unless changed during the simulation, need only be provided or specified to the HLPL model one time. In a typical implementation, the HLPL model is a transactional model that is capable of generating output data in response to receiving input data. The output data is made available some amount of time after receiving the input data. In such cases, the HLPL model does not require each clock event (e.g., does not need to receive a clock event corresponding to each clock edge), but rather requires only a clock period to simulate a delay time. By providing the HLPL model with the clock period in lieu of providing all clock events, the HLPL model is capable of simply calculating the amount of time that is to elapse before providing output and provide the output at the calculated time. This configuration avoids having to generate and provide clock events to the HLPL model during runtime.

Figure 4:
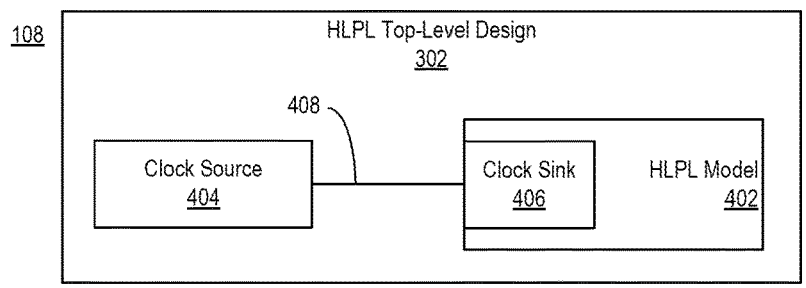
FIG. 4 illustrates example operations performed by the EDA system of FIG. 1.

FIG. 4 illustrates an example of the operations performed by EDA system 100 in block 210. In the example of FIG. 4, HLPL top-level design 302 includes an HLPL model 402. In the example of FIG. 4, EDA system 100 has modified the interface of HLPL model 402 by generating a software-based clock infrastructure that is inserted into circuit design 108. The software-based clock infrastructure includes a clock source 404, a clock sink 406, and a virtual channel 408. Clock source 404 may be an HLPL specified clock source. Clock sink 406 may be an HLPL specified clock sink.

Clock source 404 and clock sink 406 communicate over virtual channel 408. Clock source 404 and clock sink 406 are adapted to HLPL model 402 in that clock source 404 conveys only the clock data, e.g., clock events, required by HLPL model 402 to operate at runtime. In this example, HLPL model 402 is a transactional model that only requires the clock period. Thus, clock source 404 provides a clock period to clock sink 406 over virtual channel 408. Clock sink 406, which may be disposed within HLPL model 402, provides the clock period to HLPL model 402. HLPL model 402 operates as described above in that HLPL model 402 generates output data a particular amount of time measured in clock periods after, and in response to, receiving input data. The output data is generated and output a particular amount of time following receipt of the input data as calculated based on the clock period. That is, HLPL 402 is capable of generating the output data N clock periods after receipt of the input data, where N is an integer value of 1 or more.

In one or more example implementations, EDA system 100 is capable of modifying the interface of HLPL model 402 by inserting clock source 404 and clock sink 406. Clock source 404 and clock sink 406 are tailored to provide only the clock information needed by HLPL model 402 for purposes of simulation. The clock information, e.g., the clock period in this example, may be provided from clock source 404 to clock sink 406 via virtual channel 408 at or about the start of runtime.

As an example, HLPL model 402 may be a memory model that only needs clock period to operate. The memory model outputs data after a given latency that is dependent on the clock period. The memory model does not require clock events during simulation to execute or function. For purposes of illustration, consider the case where the memory model provides output after 10 clock cycles. Rather than providing 10 clock cycles to the memory model during runtime of the simulation, the memory model may be provided with the clock period so that the memory model may respond or output data after a time that is equivalent to 10 clock cycles. This saves 10 clock events each time the model executes thereby improving runtime of the simulation. As may be seen, these benefits continue to increase the more the memory model is executed and the more HLPL models to which these techniques may be applied.

In one or more example implementations, in cases where the clock period changes, an updated clock period may be provided to the HLPL model via virtual channel 408. Otherwise, clock period need only be communicated one time. Again, the HLPL model need only be aware of the changing clock period and not receive clock events as is the case with an HDL model or other HLPL model with more stringent clock requirements. The example of FIG. 4 and other examples described herein illustrate how HLPL models may be provided with enough clock information to execute during simulation and are not provided clock events that are not needed.

In block 212, for each HLPL model that is disposed in a hierarchical IP, EDA system 100 is capable of modifying the interface of the HLPL model to use a virtual channel when the clock period is unchanging. For those HLPL models disposed in a hierarchical IP that operate using a clock period that changes during the simulation, EDA system 100 is capable of leaving the clock channel for the HLPL model unchanged.

Figure 5:
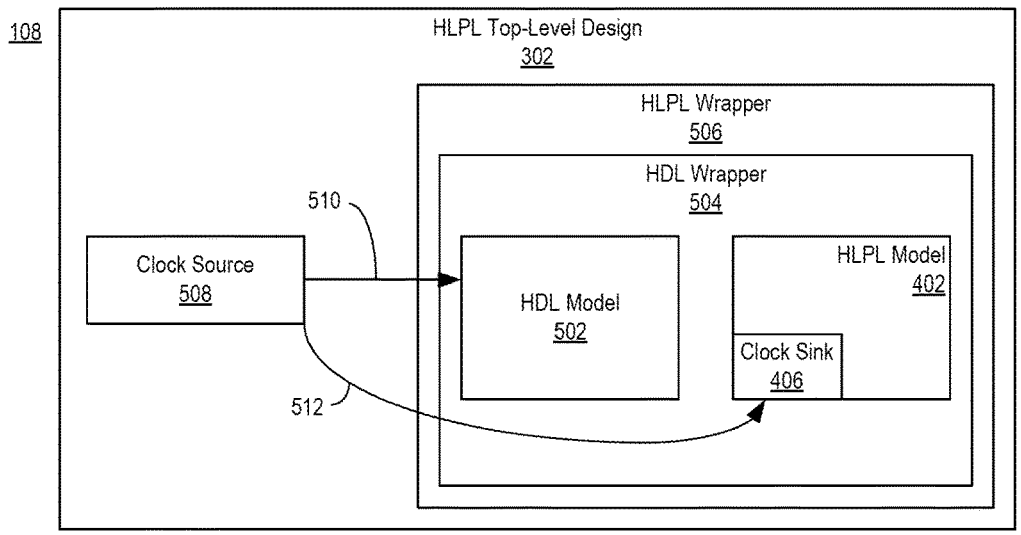
FIG. 5 illustrates example operations performed by the EDA system of FIG. 1.

FIG. 5 illustrates an example of the operations performed by EDA system 100 in block 212. In the example of FIG. 5, an HDL model 502 and HLPL model 402 are disposed in an HDL wrapper 504. HDL wrapper 504 is disposed in an HLPL wrapper 506. HLPL wrapper 506 is disposed in HLPL top-level design 302. In the example of FIG. 5, EDA system 100 has modified the interface of HLPL model 402 by generating a software-based clock infrastructure that is inserted into circuit design 108. The software-based clock infrastructure includes a clock source 508, a clock sink 406, and a virtual channel 512. Clock source 508 may be an HLPL specified clock source. Clock sink 406 may be an HLPL specified clock sink.

In the example, EDA system 100 has inserted clock source 508 and clock sink 406 into HLPL model 402. Clock source 508 is capable of driving clock events to HDL model 502 by way of a clock channel 510 and provide clock data needed by HLPL model 402 via virtual channel 512 to clock sink 406. As discussed in the example of FIG. 4, clock source 508 conveys the clock period to clock sink 406 over virtual channel 512. The clock period is provided to HLPL model 402 in lieu of the clock events that are provided to HDL model 502. In the example of FIG. 5, the clock period used by HLPL model 402 throughout simulation remains the same or constant.

Figure 6:
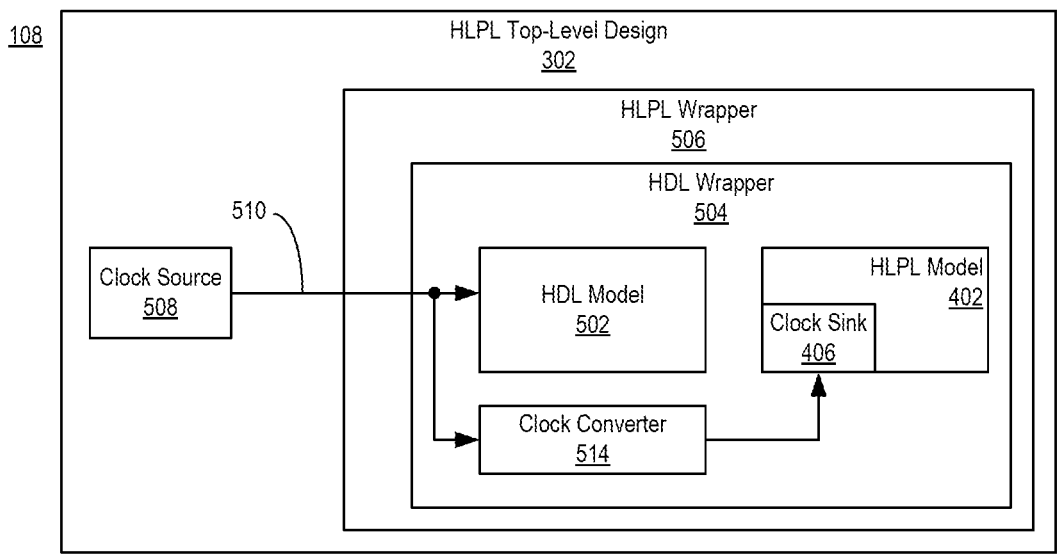
FIG. 6 illustrates an example of a mixed language circuit design including an HDL model and a high-level programming language (HLPL) model within a same hierarchical level of the circuit design.

In the example of FIG. 6, the clock period used by HLPL model 402 is not constant, but rather changes during runtime of the simulation. In the example of FIG. 6, circuit design 108 includes a clock converter 514 that is capable of varying the clock frequency (e.g., clock period) that is provided to HLPL model 402. In the example of FIG. 6, EDA system 100 leaves clock channel 510 unchanged in block 212. That is, both HDL model 502 and HLPL model 402 remain driven by clock channel 510, which conveys clock events corresponding to clock edges.

Within the examples described, e.g., FIGS. 3-6, data ports of the various models are not illustrated. It will be appreciated that HLD models include pin interfaces. HLPL models may include transaction interfaces, pin interfaces, or both depending on the type of model that is implemented. In one or more other embodiments, in cases with a hierarchical circuit design where a clock is provided to a child by way of a parent, EDA system 100 is capable of providing the clock, e.g., clock channel or virtual channel, directly to the child thereby bypassing the hierarchy of the circuit design. Having the clock bypass the circuit design hierarchy and, in doing so, bypassing language boundary crossings leads to more efficient runtime behavior for simulator 104 and DUT 110 since propagating signals and/or information such as clock signals is computationally expensive.

In the case where the top-level design of circuit design 108 is specified in HDL, method 200 continues to block 214. In block 214, EDA system 100 is capable of detecting the models in the circuit design driven by a clock channel and determine a type of each model. For example, for each model determined to be driven by a clock channel, EDA system 100 determines whether the model is an HDL model or an HLPL model.

In block 216, EDA system 100 leaves the clock channel coupled to, e.g., or driving, each HDL model unchanged.

In block 218, EDA system 100 determines the required clock data needed by each of the HLPL models. In some cases, HLPL models have a clock interface that specifies particular pins. The HLPL model is said to have a pin interface. In such cases, the HLPL model is not considered a transaction level model since the HLPL model relies on receiving clock events, e.g., clock events synchronized with the clock events provided to HDL models, for operation. The HLPL model, for example, may communicate directly with an HDL model and, as such, require all clock events in synchrony with those of the HDL model. In other cases, the HLPL model requires only the clock period for operation as previously described. In still other cases, the HLPL model may require some clock events, but not all clock events and the clock events that are required need not be synchronized in time with the clock events provided to the HDL model. EDA system 100 is capable of determining the category of each HLPL model in terms of needed clock information.

In block 220, for each HLPL model that is a transaction level model that requires only the clock period, EDA system 100 is capable of modifying the interface of the HLPL model by disconnecting the clock channel from the HLPL model. In that case, EDA system 100 assigns the clock period to the HLPL model as a property of the interface of the HLPL model.

Figure 7:
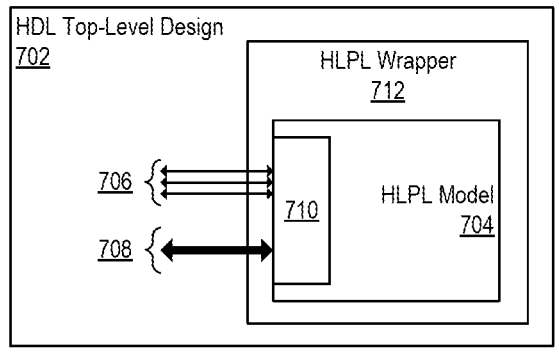
FIG. 7 illustrates example operations performed by the EDA system of FIG. 1.

FIG. 7 illustrates an example of the operations performed by EDA system 100 in block 220. In the example of FIG. 7, HDL top-level design 702 includes HLPL model 704 disposed in an HLPL wrapper 712. HLPL model 704 has an interface 710 that specifies particular pins, e.g., a pin interface 706, and a transaction level interface 708. In the example, EDA system 100 determines that HLPL model 704 does not require any clocking information other than the clock period despite having a pin interface 706 since HLPL model 704 is a transaction-based or functional model. Accordingly, EDA system 100 has disconnected, or decoupled, the clock channel (not shown) from HLPL model 704. EDA system 100 is capable of assigning the clock period to HLPL model 704 as a parameter of interface 710. In one or more example implementations, EDA system 100 decouples the clock channel from HLPL wrapper 712, which wraps HLPL model 704. Accordingly, HLPL model 704 does not receive clock events during simulation.

In block 222, for each HLPL model that is a transaction level model that also uses at least some clock events, EDA system 100 is capable of modifying the interface of the HLPL model by generating software-based clock infrastructure. EDA system 100 is capable of instantiating, e.g., inserting, a clock source within the HLPL wrapper. The clock source drives the HLPL model.

Figure 8:
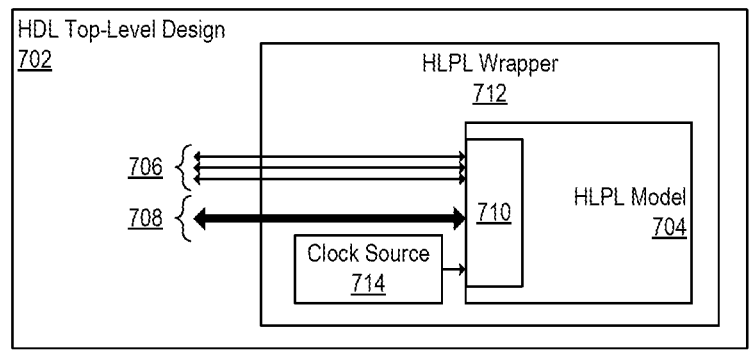
FIG. 8 illustrates example operations performed by the EDA system of FIG. 1.

FIG. 8 illustrates an example of the operations performed by EDA system 100 in block 222. In the example of FIG. 8, EDA system 100 determines that HLPL model 704 does use one or more, e.g., not all, clock events during the simulation. In that case, EDA system 100 modifies interface 710 by inserting clock source 714 within HLPL wrapper 712. Clock source 714 may be an HLPL specified clock source. Clock source 714 is capable of generating and providing those clock events, e.g., only those clock events, needed by HLPL model 704 for the simulation. The clock events provided by clock source 714 may be Boolean encoded clock events similar to those provided by an HDL clock source, but may be fewer in number than the clock events generated and provided to HDL models and that would have otherwise been provided to HLPL model 704 had a conventional clock channel been used. Further, the clock events generated by clock source 714 and provided to HLPL model 704 need not be synchronized with the clock events generated and provided to HDL models of circuit design 108.

Figure 9:
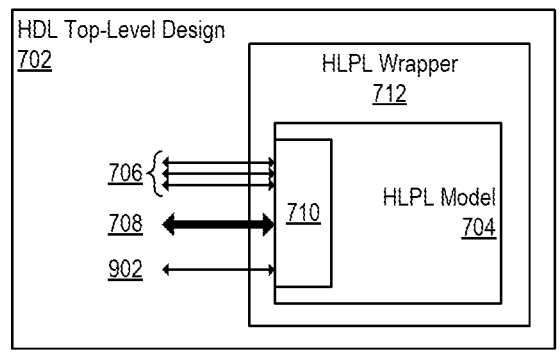
FIG. 9 illustrates an example of a mixed language circuit design including an HLPL model.

In block 224, for each HLPL model that is a transaction level model that uses synchronized clock events, EDA system 100 leaves the clock channel unchanged. FIG. 9 illustrates an example where the clock channel 902 provided to HLPL model 704 is left unchanged by EDA system 100. Over clock channel 902, HLPL model 704 receives clock events indicating transitioning clock edges, e.g., all clock events, during simulation.

Figure 10:
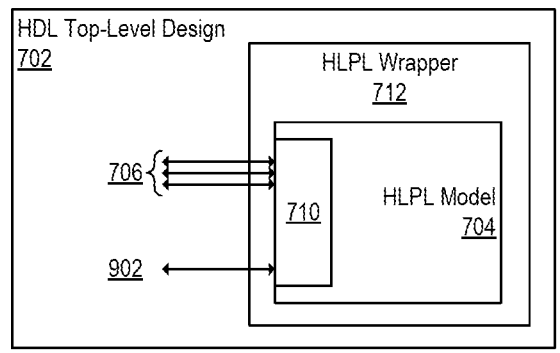
FIG. 10 illustrates an example of a mixed language circuit design including an HLPL model.

In block 226, for each HLPL model that is not a transaction level model and that has a pin interface, EDA system 100 leaves the clock channel unchanged. FIG. 10 illustrates an example where the clock channel 902 provided to HLPL model 704 is left unchanged by EDA system 100. In the example of FIG. 10, since HLPL model 704 is not a transaction level model, the interface of HLPL model 704 does not include a transaction level interface 708.

In blocks 224 and 226, EDA system 100 leaves the clock channel unchanged since the HLPL model needs the clock events provided to cycle accurate models, e.g., as synchronized, to execute during the simulation.

Figure 11:
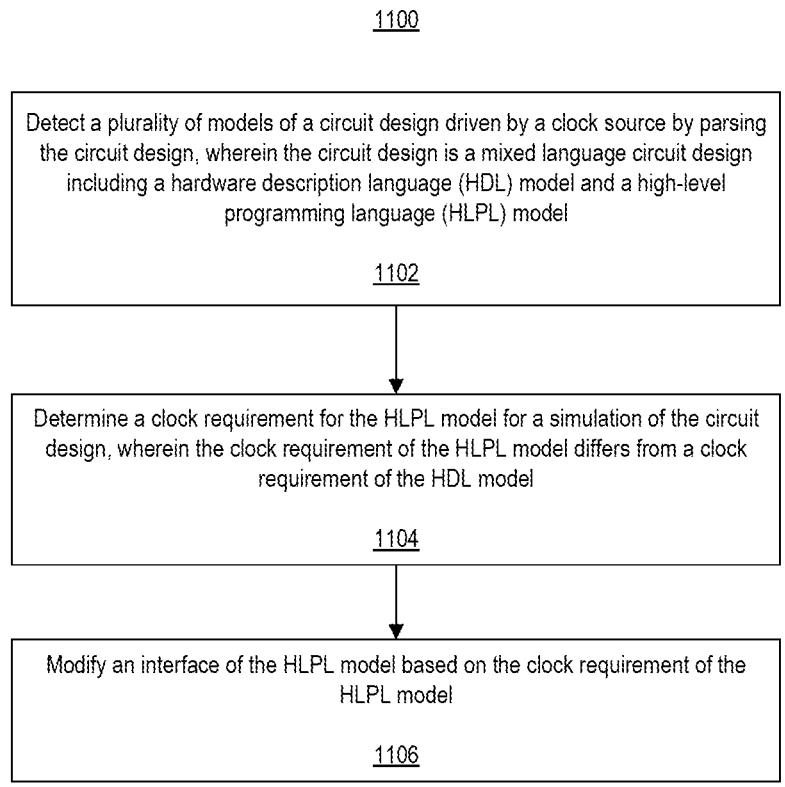
FIG. 11 illustrates an example method of simulating a mixed language circuit design in accordance with the inventive arrangements described within this disclosure.

FIG. 11 illustrates an example method 1100 of simulating a mixed language circuit design in accordance with the inventive arrangements described herein. FIG. 11 may be performed by an EDA system as described herein in connection with FIG. 1 and FIG. 12.

In block 1102, the system is capable of detecting, using computer hardware, a plurality of models of a circuit design driven by a clock source by parsing the circuit design. The circuit design is a mixed language circuit design including an HDL model and an HLPL model. In block 1104, the system is capable of determining, using the computer hardware, a clock requirement for the HLPL model for a simulation of the circuit design. The clock requirement of the HLPL model differs from a clock requirement of the HDL model. In block 1106, the system is capable of modifying, using the computer hardware, an interface of the HLPL model based on the clock requirement of the HLPL model.

The foregoing and other implementations can each optionally include one or more of the following features, alone or in combination. Some example implementations include all the following features in combination.

In one aspect, the system is capable of simulating the circuit design, wherein the HDL model receives clock events over a clock channel and the HLPL model receives clock information in lieu of the clock events via the modified interface. Clock information may include the clock period and/or other clock-related metadata such as duty cycle, first edge type (positive or negative), offset, and the like. The system is capable of simulating the circuit design with the modifications to the interface(s) of the HLPL models as described herein. As noted, runtime of the simulation executes more efficiently (e.g., faster and/or in less time) owing to the reduction in generated and/or distributed clock events during the simulation runtime.

In another aspect, the system is capable of generating a software-based clock infrastructure having a virtual channel configured to convey clock information to the HLPL model in lieu of clock events for the simulation.

In another aspect, the system is capable of inserting, into the circuit design, an HLPL clock source and an HLPL clock sink coupled to the HLPL model. The virtual channel couples the HLPL clock source to the HLPL clock sink. The HLPL clock source is configured to convey the clock information from the HLPL clock source to the HLPL clock sink over the virtual channel.

In another aspect, the HLPL model is first determined to be a non-hierarchical HLPL model.

In another aspect, the system is capable of detecting a further HLPL model disposed in a hierarchical model of the circuit design, determining that a frequency of a clock signal provided to the further HLPL model does not change during operation of the circuit design, and in response to the determining, inserting, into the circuit design, a software-based clock infrastructure having a virtual channel. The software-based clock infrastructure is configured to convey clock information to the further HLPL model in lieu of clock events.

In another aspect, the system is capable of decoupling, or disconnecting, the HLPL model from the clock source in response to determining that the HLPL model does not require clock events. The HLPL model is provided clock information as an interface property in lieu of the clock events.

In another aspect, the HDL model receives clock events during the simulation from the clock source. The system is capable of instantiating an HLPL clock source within a wrapper for the HLPL model in response to determining that the HLPL model requires selected clock events and is not required to be in synchronization with the clock events of the HDL model.

Figure 12:
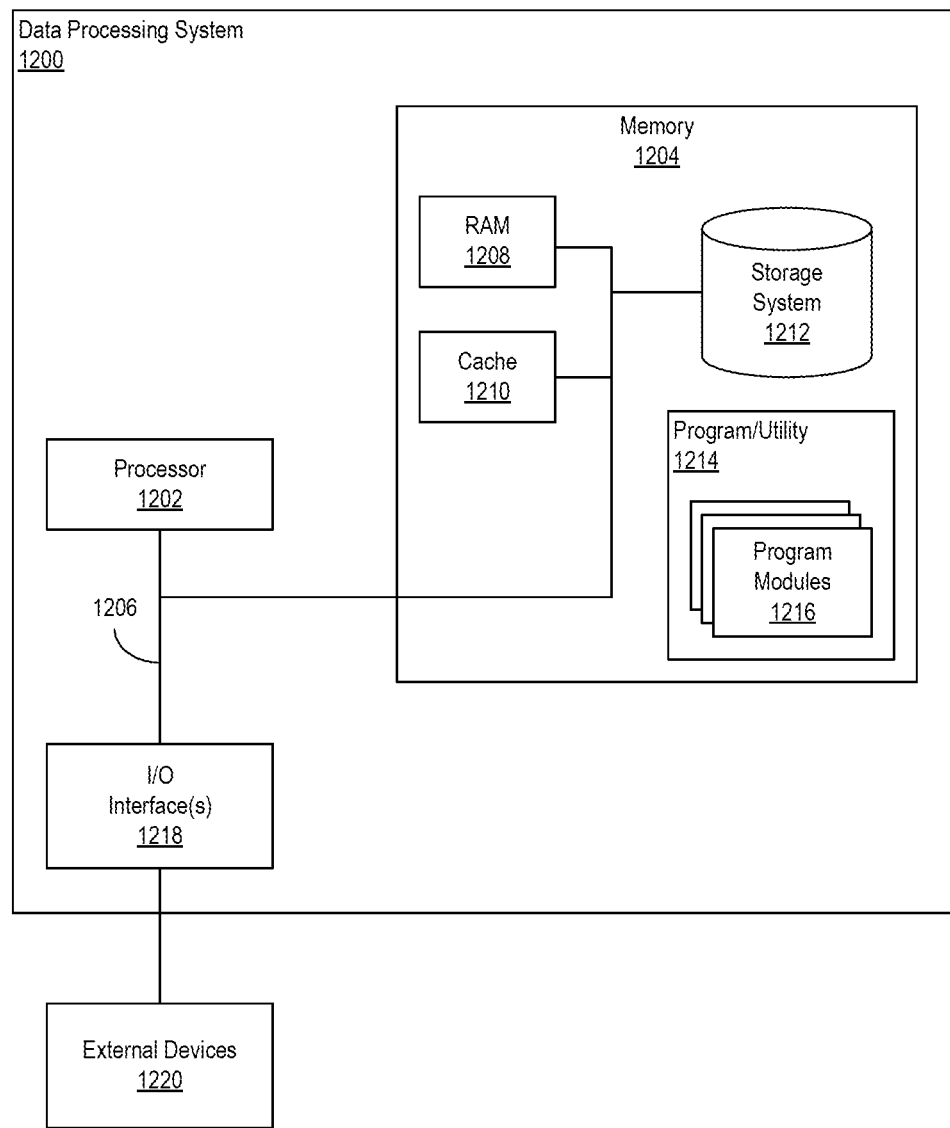
FIG. 12 illustrates an example implementation of a data processing system for use with the inventive arrangements described within this disclosure.

FIG. 12 illustrates an example implementation of a data processing system 1200. The components of data processing system 1200 can include, but are not limited to, a processor 1202, a memory 1204, and a bus 1206 that couples various system components including memory 1204 to processor 1202. Processor 1202 may be implemented as one or more processors. In an example, processor 1202 is implemented as a central processing unit (CPU). Example processor types include, but are not limited to, processors having an x86 type of architecture (IA-32, IA-64, etc.), Power Architecture, ARM processors, and the like.

Bus 1206 represents one or more of any of a variety of communication bus structures. By way of example, and not limitation, bus 1206 may be implemented as a Peripheral Component Interconnect Express (PCIe) bus. Data processing system 1200 typically includes a variety of computer system readable media. Such media may include computer-readable volatile and non-volatile media and computer-readable removable and non-removable media.

Memory 1204 can include computer-readable media in the form of volatile memory, such as random-access memory (RAM) 1208 and/or cache memory 1210. Data processing system 1200 also can include other removable/non-removable, volatile/non-volatile computer storage media. By way of example, storage system 1212 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1206 by one or more data media interfaces. Memory 1204 is an example of at least one computer program product.

Program/utility 1214, having a set (at least one) of program modules 1216, may be stored in memory 1204. Program/utility 1214 is executable by processor 1202. By way of example, program modules 1216 may represent an operating system, one or more application programs, other program modules, and program data. Program modules 1216, upon execution, cause data processing system 1200, e.g., processor 1202, to carry out the functions and/or methodologies of the example implementations described within this disclosure. Program/utility 1214 and any data items used, generated, and/or operated upon by data processing system 1200 are functional data structures that impart functionality when employed by data processing system 1200. For example, one or more program modules 1216 may implement EDA system 100 as described herein.

Data processing system 1200 may include one or more Input/Output (I/O) interfaces 1218 communicatively linked to bus 1206. I/O interface(s) 1218 allow data processing system 1200 to communicate with one or more external devices 1220 and/or communicate over one or more networks such as a local area network (LAN), a wide area network (WAN), and/or a public network (e.g., the Internet). Examples of I/O interfaces 1218 may include, but are not limited to, network cards, modems, network adapters, hardware controllers, etc. Examples of external devices also may include devices that allow a user to interact with data processing system 1200 (e.g., a display, a keyboard, and/or a pointing device) and/or other devices such as accelerator card.

Data processing system 1200 is only one example implementation. Data processing system 1200 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 12 is not intended to suggest any limitation as to the scope of use or functionality of example implementations described herein. Data processing system 1200 is an example of computer hardware that is capable of performing the various operations described within this disclosure.

In this regard, data processing system 1200 may include fewer components than shown or additional components not illustrated in FIG. 12 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1200 may be operational with numerous other general-purpose or special-purpose computing system environments or configurations. Examples of computing systems, environments, and/or configurations that may be suitable for use with data processing system 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1200 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
    detecting, using computer hardware, a first model and a second model of a circuit design driven by a clock source through a clock channel configured to convey clock events specifying a clock signal;
    wherein a clock requirement of the first model for a simulation of the circuit design differs from a clock requirement of the second model for the simulation; and
    modifying, using the computer hardware, an interface of the first model based on the clock requirement of the first model by disconnecting the first model from the clock channel and inserting, into the circuit design, a virtual channel formed of a further clock source and a clock sink that couples to the first model;
    wherein the virtual channel is configured to convey, to the first model, clock information specified by the clock requirement of the first model.

2. The method of claim 1, wherein the second model receives the clock events over the clock channel and the first model receives a clock period over the virtual channel.

3. The method of claim 2, wherein the clock period is provided to the first model in lieu of the clock signal for the simulation.

4. The method of claim 1, wherein the virtual channel conveys less information to the first model than is conveyed over the clock channel to the second model during the simulation.

5. The method of claim 1, wherein the first model is first determined to be a non-hierarchical model.

6. The method of claim 1, wherein
a frequency of the clock signal provided to the first model does not change during operation of the circuit design.

7. The method of claim 1, further comprising:
for an additional model of the circuit design coupled to the clock source, decoupling the additional model from the clock source in response to determining that the additional model does not require the clock events; and
providing clock information to the additional model as an interface property in lieu of the clock signal.

8. The method of claim 1, further comprising:
for an additional model of the circuit design, instantiating an additional clock source within a wrapper for the additional model in response to determining that the additional model requires fewer of the clock events than the second model during the simulation and is not required to be in synchronization with the clock events of the second model during the simulation.

9. A system, comprising:
a processor configured to initiate operations including:
detecting a first model and a second model of a circuit design driven by a clock source through a clock channel configured to convey clock events specifying a clock signal;
wherein a clock requirement of the first model for a simulation of the circuit design differs from a clock requirement of the second model for the simulation; and
modifying an interface of the first model based on the clock requirement of the first model by disconnecting the first model from the clock channel and inserting, into the circuit design, a virtual channel formed of a further clock source and a clock sink that couples to the first model;
wherein the virtual channel is configured to convey, to the first model, clock information specified by the clock requirements of the first model.

10. The system of claim 9, wherein the second model receives the clock events over the clock channel and the first model receives a clock period over the virtual channel.

11. The system of claim 10, wherein the clock period is provided to the first model in lieu of the clock signal for the simulation.

12. The system of claim 9, wherein the virtual channel conveys less information to the first model than is conveyed over the clock channel to the second model during the simulation.

13. The system of claim 9, wherein the first model is first determined to be a non-hierarchical model.

14. The system of claim 9, wherein
a frequency of the clock signal provided to the first model does not change during operation of the circuit design.

15. The system of claim 9, wherein the processor is configured to initiate operations including:
for an additional model of the circuit design coupled to the clock source, decoupling the additional model from the clock source in response to determining that the additional model does not require the clock events; and
providing clock information to the additional model as an interface property in lieu of the clock signal.

16. The system of claim 9, wherein the processor is configured to initiate operations including:
for an additional model of the circuit design, instantiating an additional clock source within a wrapper for the additional model in response to determining that the additional model requires fewer of the clock events than the second model during the simulation and is not required to be in synchronization with the clock events of the second model during the simulation.

17. A computer program product, comprising:
one or more non-transitory computer readable storage media, and program instructions collectively stored on the one or more computer readable storage media, wherein the program instructions are executable by computer hardware to initiate operations including:
detecting a first model and a second model of a circuit design driven by a clock source through a clock channel configured to convey clock events specifying a clock signal;
wherein a clock requirement of the first model for a simulation of the circuit design differs from a clock requirement of the second model for the simulation; and
modifying an interface of the first model based on the clock requirement of the first model by disconnecting the first model from the clock channel and inserting, into the circuit design, a virtual channel formed of a further clock source and a clock sink that couples to the first model;
wherein the virtual channel is configured to convey, to the first model, clock information specified by the clock requirements of the first model.

18. The computer program product of claim 17, wherein the second model receives the clock events over the clock channel and the first model receives a clock period over the virtual channel.

19. The computer program product of claim 18, wherein the clock period is provided to the first model in lieu of the clock signal for the simulation.

20. The computer program product of claim 17, wherein the virtual channel conveys less information to the first model than is conveyed over the clock channel to the second model during the simulation.

* * * * *